United States Patent [19]
Iino

[11] Patent Number: 5,334,995
[45] Date of Patent: Aug. 2, 1994

[54] INDICATION DISPLAY UNIT FOR VEHICLES

[75] Inventor: Tadashi Iino, Shizuoka, Japan

[73] Assignee: Yazaki Corporation, Tokyo, Japan

[21] Appl. No.: 730,745

[22] Filed: Jul. 16, 1991

[30] Foreign Application Priority Data

Aug. 10, 1990 [JP] Japan .................. 2-210255

[51] Int. Cl.⁵ .............................. G09G 3/02
[52] U.S. Cl. ........................ 345/7; 340/980; 340/525; 340/461
[58] Field of Search ........... 340/980, 705, 525, 461

[56] References Cited

U.S. PATENT DOCUMENTS

| | | | |
|---|---|---|---|
| 3,806,866 | 4/1974 | Reboul | 340/980 |
| 4,218,111 | 8/1980 | Withrington et al. | 340/705 |
| 4,269,476 | 5/1981 | Gauthier et al. | 340/705 |
| 4,600,271 | 7/1986 | Boyer et al. | 340/705 |
| 4,831,366 | 5/1989 | Iino | 340/461 |
| 4,961,625 | 10/1990 | Wood et al. | 350/174 |
| 5,172,100 | 12/1992 | Iino | 359/640 |

FOREIGN PATENT DOCUMENTS

| | | |
|---|---|---|
| 0303742 | 2/1989 | European Pat. Off. . |
| 4125070 | 2/1992 | Fed. Rep. of Germany . |
| 2249855 | 8/1981 | United Kingdom . |

OTHER PUBLICATIONS

Office Action, German Patent Office, Appln. No. P 41 23 905.9-21 (English language translation).

Primary Examiner—John K. Peng
Assistant Examiner—Nina Tong
Attorney, Agent, or Firm—Armstrong, Westerman, Hattori, McLeland & Naughton

[57] ABSTRACT

The present invention provides an indication display unit for vehicles which comprises an indicating means for displaying vehicle operational information either firmly attached on the dashboard or encased in a case disposed in a dashboard, and a prism having at least three faces mounted on the dashboard in such a manner that a crest portion thereof is directed upwards at which a first and a second faces thereof abutting with each other, the first and second faces being directed, respectively, toward the driver's seat and to the windshield, and the third face firmly attached either to the dashboard or to the case such that the indication surface of the indicating means is directed upwards, whereby an indicated image projected from the indicating means enters the prism by way of the third face thereof, the indicated image entered the prism being reflected on the inner surface of the second face so as finally to be visibly observed through the first face.

The above indication display unit enables a driver to visibly observe an indicated image near the driver's visual field of the windshield by reflecting the indicated image from the indicating member on a reflecting member mounted on the dashboard, and at the same time provides a stably maintained reflecting surface, an improved observability and also an improved image quality are provided.

2 Claims, 5 Drawing Sheets

INDICATION DISPLAY UNIT FOR VEHICLES

BACKGROUND OF THE INVENTION

1. Field of the Invention

The present invention relates to an indication display unit for vehicles including indicators for indicating operational information such as vehicle speed, engine speed, residual fuel quality, time and other warnings, and also including a reflecting member having a reflecting surface on which indicated images by the indicators are reflected to allow the reflecting images to be visibly observed by a driver.

2. Description of the Related Art

Conventionally, there have been proposed various indication display unit for vehicles, a case in point being the one shown in FIG. 7.

This type of indication display unit is called a head-up display unit, wherein a projector 10 with its indicating surface directed upwards for indicating various information such as vehicle speed and so on is disposed in the dashboard 20, and the indicated image from the projector 10 is reflected on a half-mirror 30 which is disposed on the dashboard 20, whereby the virtual image 50 thereof, which is superposed on the external front view seen through the windshield 60, can be visibly observed from a visual point 40 at the driver's seat.

By use of the head-up display device as constructed above, the driver can observe the indicated image without turning his eyes toward various indicating meters, and an improved observability is thereby made possible.

Since the driver can visibly observe the external front view through a half-mirror because there is no hindrance caused to the driver's visual field with respect to the windshield, the aforementioned conventional device is optimum for a head-up display type unit. However, the half-mirror is rather weak either as itself or as a material to be constructed on the dashboard which is supposed to be firmly fixed thereon, and accordingly it is not easy to maintain the reflecting surface thereof in a stable position. In addition, since the indication light (or a light projected for indication) is reflected on two surfaces of the half-mirror, in the front and rear surfaces, there is a double image produced thereby, and this doubled image reflected on the half-mirror can be distinctly observed in some occasions, especially when the indicated image is substantially small, causing an inferior observability, and inferior quality of the indicated image itself.

Even though the indicated image is not fully superposed on the external front view as is done in the conventional device, a substantially similar effect to that of the head-up display using a half-mirror can be obtained, in which the indicated image is observed around the driver's visual field of the windshield, such as a nearby area of the upper surface of the dashboard.

SUMMARY OF THE INVENTION

In view of the deficiencies described above it is an object of the present invention to provide an indication display unit for vehicles which enables a driver to visibly observe an indicated image near the driver's visual field of the windshield by reflecting the indicated image from the indicating member on a reflecting member mounted on the dashboard, in which the reflecting member is other than a conventional type head-up display unit adopting a half-mirror and yet having a substantially similar effect. whereby a stably maintained reflecting surface, an improved observability and also an improved image quality are provided.

An indication display unit for vehicles according to the present invention provided to solve the above problems comprises an indicating member for displaying vehicle operational information encased in the dashboard; a prism mounted on the dashboard in such a manner that a crest portion of the prism is directed upwards at which a first and a second faces thereof abutting with each other, the abutting faces being directed respectively toward the driver's seat and to the windshield, wherein an indication light from the indicating member enters the prism by way of a third face of the prism which is facing the dashboard, the indication light then reflected on the inner surface of the second face directed to the windshield so as finally to be visibly observed through the first face directed to the driver's seat.

In the indication display unit for vehicles according to the present invention, an indication light from the indicating member enters the prism by way of the third face thereof which is facing the dashboard, and the thus entered indication light is reflected within the prism on the inner surface of the second face directed to the windshield, and then finally goes out of the prism to the driver's seat through the first face thereof which is directed toward the driver's seat. Accordingly, the driver sitting at the driver's seat can observe operational information indicated by the indicating member in the visual field on the second face of the prism directed to the windshield by way of the first face thereof. Since the prism is disposed on the dashboard, the second face thereof is located around the visual field of the windshield, so that operational information is visibly observed by the driver around his visual field of the windshield.

Further, since the prism has its crest portion directed upwards, it is stably disposed on the dashboard due to the width of the third face of the prism which faces the dashboard.

Still further, the indication light directed toward the driver's seat is reflected only once on the inner surface of the second face of the prism, there is no doubled image produced as discussed above.

Other objects and features of the invention will be more fully understood from the following detailed description and appended claims when taken in conjunction with the accompanying drawings.

DETAILED DESCRIPTION OF THE PREFERRED EMBODIMENTS

Figure 1:
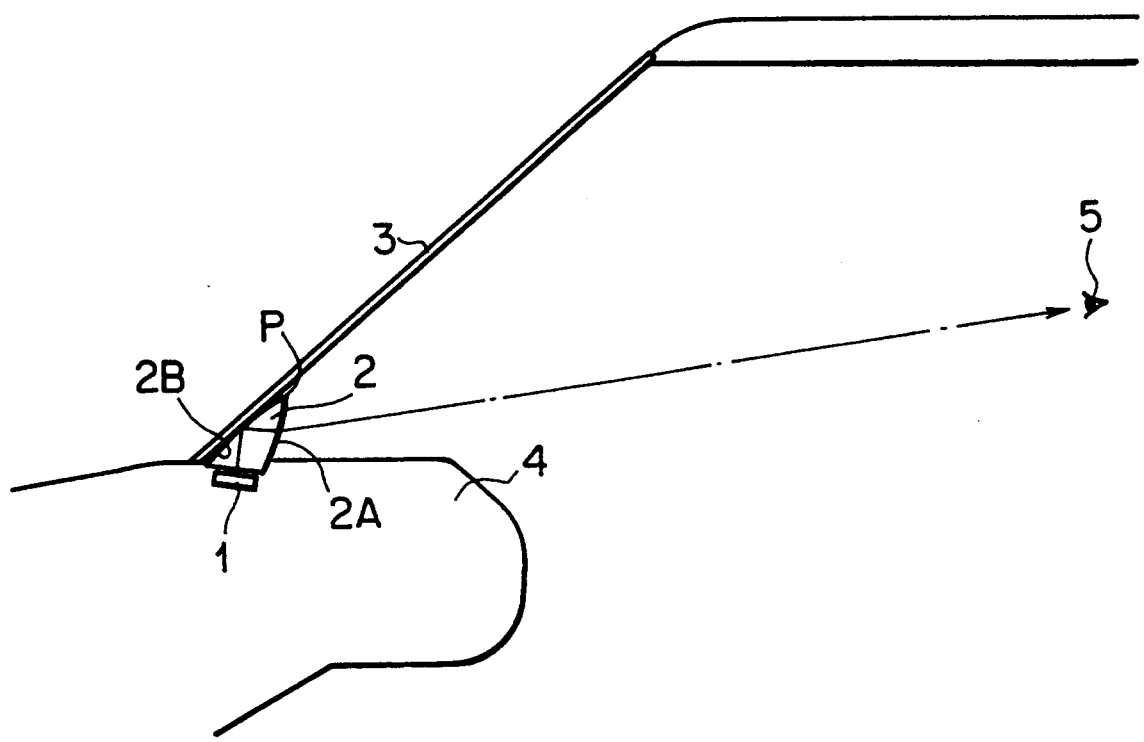
FIG. 1 is a perspective view of one preferred embodiment of the indication display unit for vehicles according to the present invention.
Figure 2:
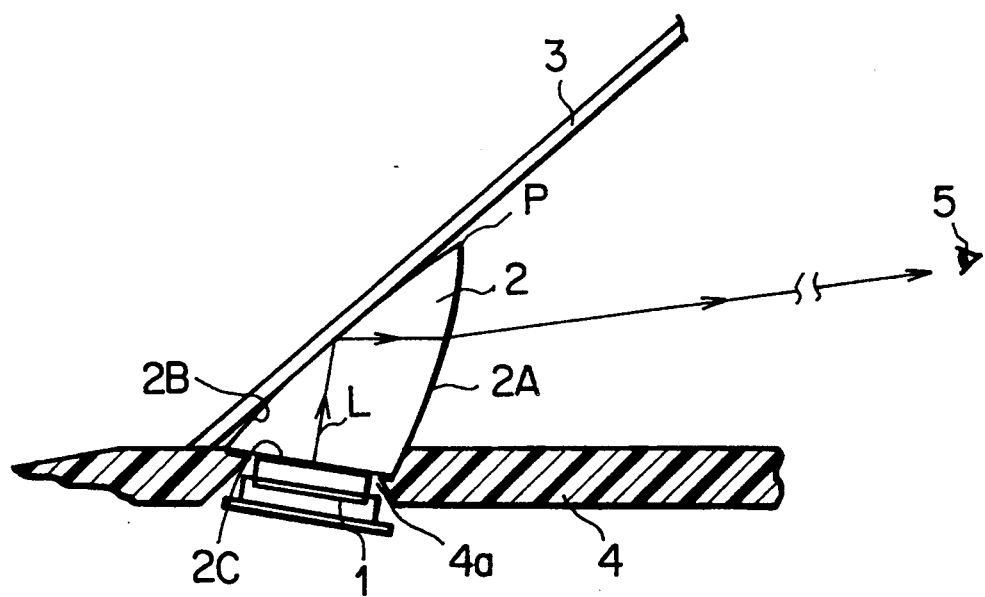
FIG. 2 is a partially exploded sectional view of the first preferred embodiment as viewed in FIG. 2.

FIG. 1 is an illustration showing a first preferred embodiment of the indication display unit for vehicles according to the present invention, and FIG. 2 is a sectional view of the same embodiment. Referring to these figures, reference numeral 1 denotes an indicating member of a self-lighting type which indicates operational information such as vehicle speed and so on, reference numeral 2 denotes a prism formed of a transparent acrylic material, numeral 3 denotes a windshield, 4 a dashboard and reference numeral 5 denotes a visual point at the driver's seat.

The indicating member 1 is encased in the dashboard 4 near the low end of the windshield 3, with its indicating surface directed upwards by way of an open inlet 4a of the dashboard 4. Indicating member 1 can be formed by a vacuum fluorescent tube (VFT), a light emitting diode (LED), back-light type liquid crystal display (LCD) or the like.

The prism 2 is disposed on the dashboard 4 at the upper position of the indicating member 1 in such a manner that a crest portion P at which the first face 2A and the second face 2B are abutting to each other is directed upward, wherein the first face 2A is directed to the driver's seat and the second face 2B is abutted to the inner surface of the windshield 3, the second face 2B being inclined towards the driver's seat. Further, the third face 2C of the prism 2 which is located facing the indicating member 1 is formed with a black coated layer, and this coated layer is formed only on the portion other than the indication pattern of the indicating member 1.

The indication light from the indicating member 1 enters the prism 2 through the third face 2C thereof, and the thus entered indication light is then reflected on the inner surface of the second face 2B toward the first face 2A side, and then transmits through the first face 2A toward the visual point 5 of the driver. Accordingly, the indicated image from the indicating member 1, which is reflected on the inner surface of the second face 2B of the prism 2, is observed within the visual field on the second face 2B by way of the first face 2A from the visual point 5 or the nearby area. By this phenomenon, the driver can observe operational information indicated by the indicating member 1 around the visual field of the windshield 3, so that a substantially similar effect to the head-up display unit can be obtained.

As shown in FIG. 2, the first face 2A and the second face 2B of the prism 2 are respectively formed in a convex shape, and due to this convex shape of the first face 2A and the second face 2B, the indicated image is magnified and positioned for viewing at a long distance.

Figure 3:
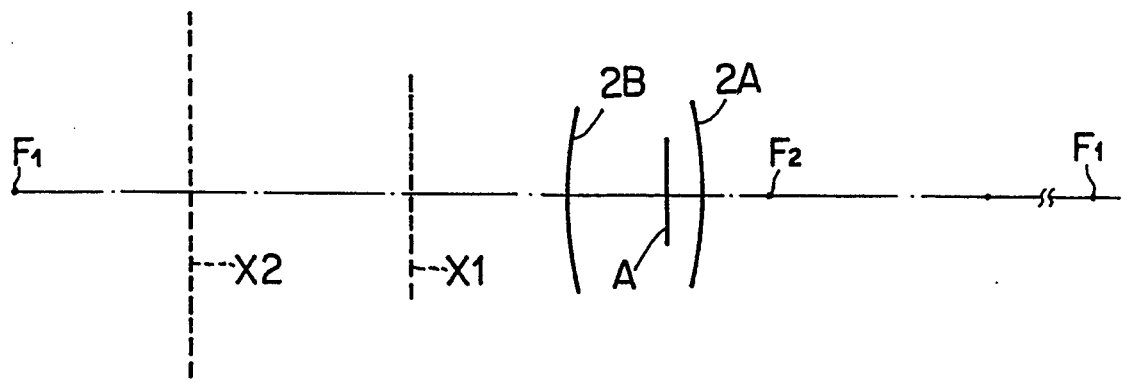
FIG. 3 is an illustration explaining how to magnify an indicated image.

FIG. 3 is an illustration explaining how the indicated image from the indicating member is magnified and positioned at a long distance, wherein a relationship among the indicating member 1, the second face 2B and the first face 2A of the prism 2 is depicted from the optical point of view.

The second face 2B is formed in a concave state with respect to the inside portion of the prism 2, and the indicating surface 1a of the indicating member 1 is located between the focal point F2 of the concave face and the second face 2B. By this construction, a virtual image X1 of the indicated image A indicated on the indicating surface 1a of the indicating member 1 is formed by way of reflection on the inner surface of the second face 2B and positioned in the long distance. On the other hand, the first face 2A functions as a concave lens with respect to the transmitted light, and is constructed such that the virtual image X1 formed by the second face 2B is located inside the focal point F1 of the concave lens formed by the first face 2A, and by this construction, the virtual image X1 is further magnified by the function of the concave lens, so that a virtual image X2 is formed at a farther distance than the position of the virtual image X1.

As shown above, the virtual image X2 which is magnified by the second face 2B and formed at a farther distance by the first face 2A can be finally observed from the visual point 5 or the nearby area.

Since the prism 2 is located near the low end of the windshield 3, the observable area from the driver's seat side (the area including the first face 2A thereof) is near the bonnet of the vehicle, the driver's visual field in the forwardly direction is not hindered thereby, yet the observable area is near the visual field of the windshield, so that a similar effect to the head-up display unit can also be obtained.

The prism 2 is supported by the dashboard 4 around the third face 2C thereof due to the fact that its crest portion P is directed upwards. In other words, the prism 2 is held in a stable position in the forward and rearward directions with respect to the dashboard 4 by the forward end and the rear end of an open inlet 4a of the dashboard 4.

Figure 4A:
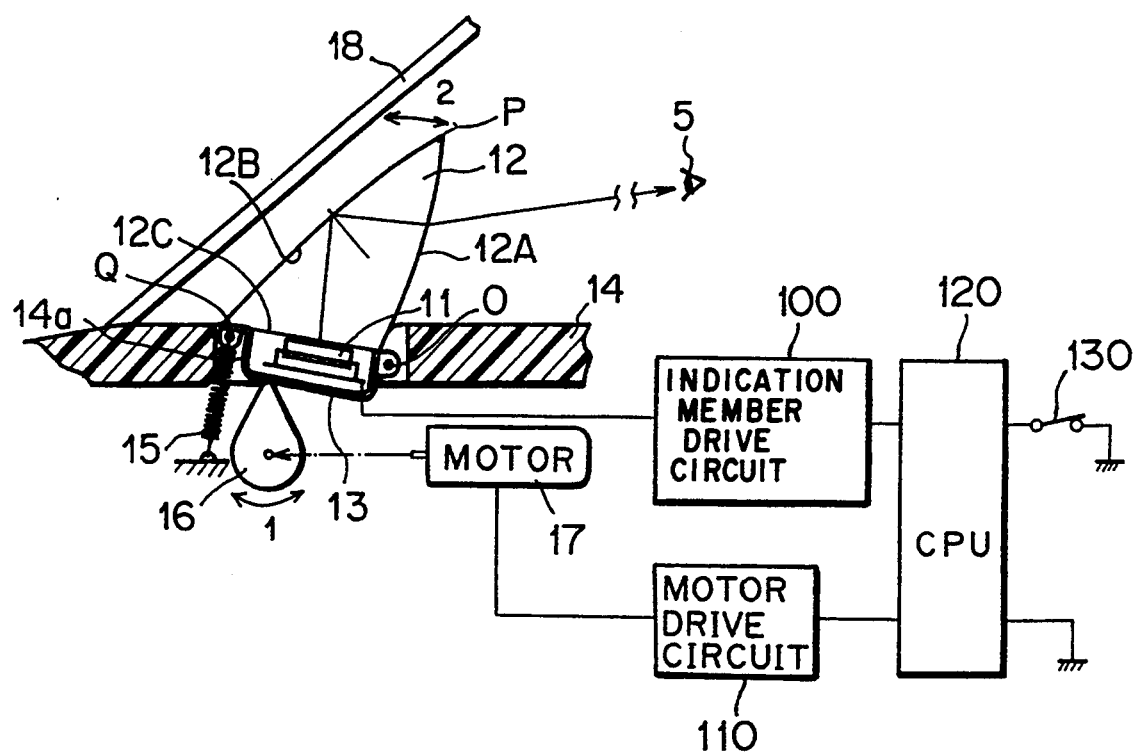
FIGS. 4A and 4B are, respectively, sectional views of the second preferred embodiment of the present invention.
Figure 4B:
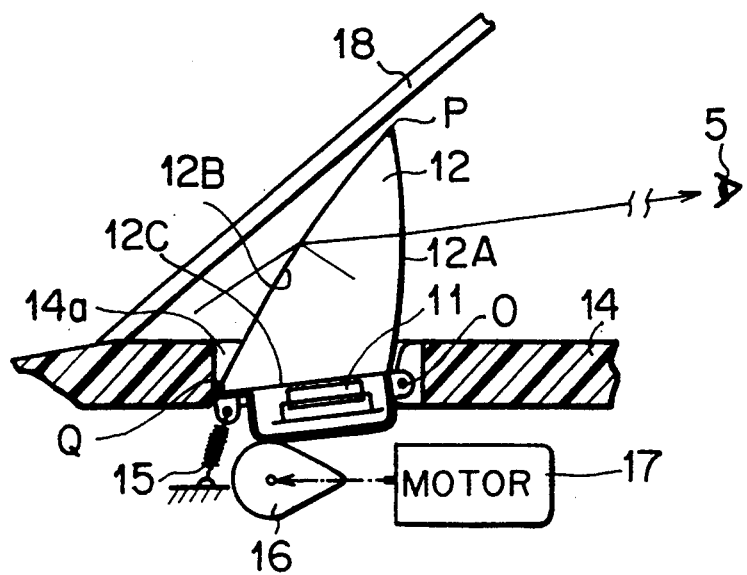

FIGS. 4A and 4B are, respectively, sectional views of the second preferred embodiment according to the present invention. In the figure, although the indicating member 11 and the prism 12 are of the same construction as the indicating member 1 and the prism 2 of the first preferred embodiment, the indicating member 11 is encased in a case 13 in the second embodiment in such a state that it is directed against the third face 12C of the prism 12, and the prism 12 is fixed to the case 13.

The case 13 is disposed within the open inlet 14a of the dashboard 14, and the rearward portion of the case 13 is axially supported at the rotation fulcrum O of the end portion of the open inlet 14a, whereas the forwardly portion of the case 13 is biased downwardly by a spring coil 15, one end of which is firmly fixed inside the dashboard 14, and due to this biased force and the self-weight dashboard of the prism 12, the lower surface of the case 13 is abutted to the cam 16 which is disposed within dashboard 14.

The cam 16 is connected to a motor 17 by way of a toothed wheel (not shown), so that when the motor 17 is activated, the cam 16 is rotated in the direction indicated by an arrow 1, in accordance with which the indicating member 11 and the prism 12 are rotated in the direction shown by an arrow 2.

Referring to FIG. 4A, reference numeral 100 denotes an indicating member drive circuit for activating the indicating member 11, reference numeral 110 denotes a motor drive circuit for driving the motor 17, numeral 120 denotes a control unit composed of a micro-processor or the like, 130 denotes an operation switch to be operated by the driver, wherein the control unit 120 outputs indication data to be indicated by the indicating member 11 to the indicating member drive circuit 100 based on the signals received from various sensors such as a vehicle speed sensor (not shown) and so forth, and then the indicating member drive circuit 100 displays a specified indication on the indicating member 11 in accordance with the thus obtained indication data.

The control unit 120 monitors the operating state of the operation switch 13, wherein when the operation switch 130 is set to "ON", it displays the indication on the indicating member 11, and also controls the activation of the motor 17 by way of the motor drive circuit 110 so as to put the prism and the indicating member 11 to the state as shown in FIG. 4A. On the other hand, when the operation switch 130 is set to "OFF", the control unit stops the indication on the indicating member 11, and at the same time controls the activation of the motor 17 so as to put the prism 12 and the indicating member 11 to the state as shown in FIG. 4B.

Figure 5:
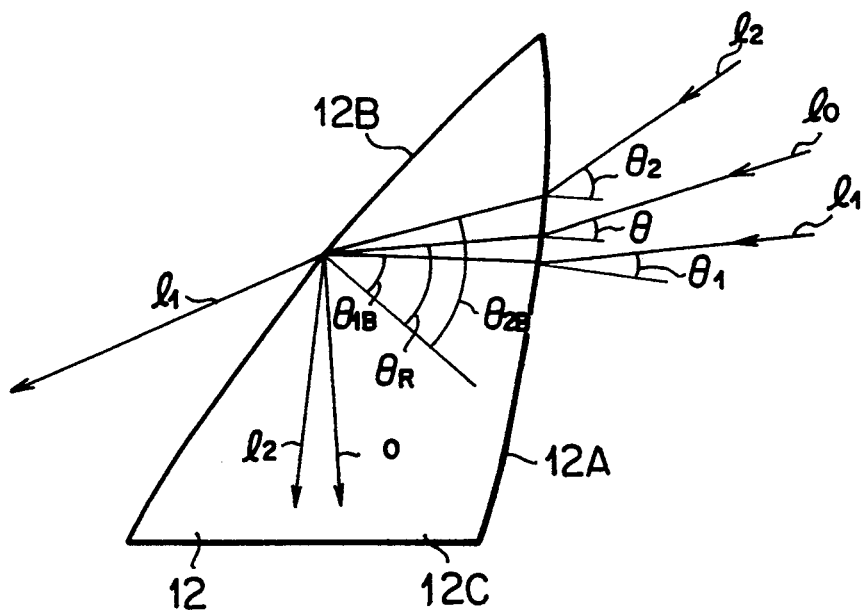
FIG. 5 is an illustration explaining the operation performed by a prism of adopted the second preferred embodiment.

FIG. 5 is an illustration explaining the operation performed by the prism 12. Referring now to the figure, considering an incident light 10 which enters from the driver's visual point or the nearby area into the prism 12, whose angle of incidence at the first face 12A of the prism is $\theta$, and that at the second face 12B is a critical angle or, in the case of an indication light 11 whose angle of incidence $\theta 1$ at the first face 12A is smaller than $\theta$ of the incident light 10 will have its angle of incidence $\theta 1b$ at the second face 12B which is smaller than the critical angle $\theta r$, it transmits through the second face 12B to the windshield 18 side. On the other hand, in the case of an incident light 12 whose angle of incidence $\theta 2$ at the first face 12A is larger than $\theta$ of the incident light 10 will have its angle of incidence $\theta 2b$ at the second face 12B which is larger than the critical angle $\theta r$, it is totally reflected to the third face 12C side of the prism 12.

The rotated position of the prism shown in FIG. 4A is predetermined such that the angle of incidence at the low end Q of the second face 12B is larger than the critical angle $\theta r$ with respect to the incident light entered from the driver's visual point or the nearby area. Further, the rotated position of the prism 12 shown in Fig. 4B is predetermined such that the angle of incidence at the crest portion P is smaller than that of the critical angle $\theta r$ with respect to the incident light entering from the driver's visual point or the nearby area.

Accordingly, as we can see by tracking the incident light explained in FIG. 5 the other way around, in the case of FIG. 4A, the second face 12B becomes a total reflecting surface, and thereby the third surface 12C and the indicating member 11 can be observed, and in the case of FIG. 4B, the prism 12 itself can be observed as a transparent body.

As explained above, since the prism 12 can be switched to a total reflecting surface or to a transparent body in accordance with the rotated location thereof, when the operation switch 130 is set to "ON" so as to display the operational information on the indicating member 11, as shown above, the indicated image can be visibly observed by way of the second face 12B with a dark color of the third face 12C as its back view. On the other hand, when the operation switch 130 is set to "OFF", and no display of indication is required, the prism 12 becomes a transparent body. Accordingly, the second face 12B, which can be a reflecting surface for indication, will not be a hindrance to the driver even when no display of indication is required.

Further, since the first face 12A and the second face 12B of the prism 12 of the second embodiment are respectively formed in convex surfaces, the indicated image is magnified and positioned in the long distance as in the case of the first embodiment. Further, since the prism 12 is disposed on the dashboard, that is, in the lower portion of the visual field in which the windshield 18 is sighted from the driver's seat, the same head-up display effect as the first embodiment can be obtained as well.

Figure 6A:
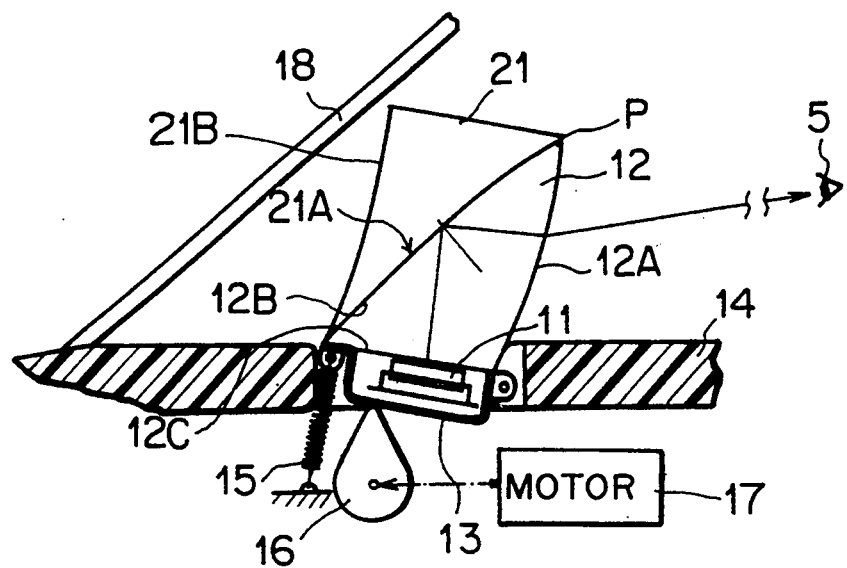
FIGS. 6A and 6B are, respectively, sectional views of a third preferred embodiment according to the present invention.
Figure 6B:
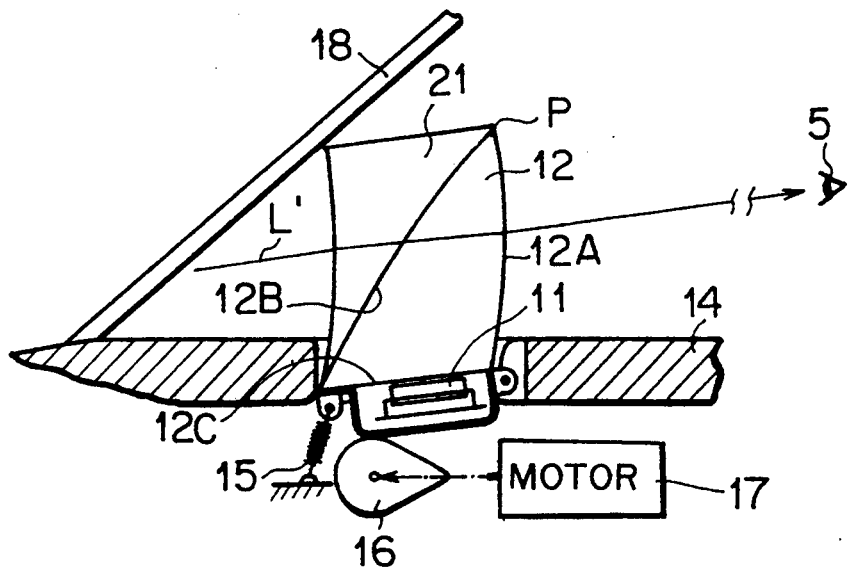

FIGS. 6A and 6B are, respectively, sectional views of the indication display unit for vehicles according to the third embodiment of the present invention, wherein a corrective prism is added to the prism 12 of the second embodiment, and the location of the open inlet 4a of the dashboard 14 is thereby shifted away from the windshield 18 for the size of this additional prism 21. The corrective prism 21 contains a concave surface 21A which is adjusted with the second face 12B of the prism 12, and a concave surface 21B which has substantially the same surface with the convex surface 12A of the prism 12, wherein the concave surface 21A and the concave surface 21B are abutted to each other, and the concave surface 21A is closely attached to the second face 12B of the prism 12.

In the state as shown in FIG. 6A, the indication of the indicating member 11 can be observed on the second face 12B of the prism 12 as the case of the second embodiment shown in FIG. 4A. In the state as shown in FIG. 6B, regarding the light L' which transmits through the corrective prism 21 and the prism 12, the light which enters and that which goes out are substantially in parallel, so that the effect caused by refraction is substantially low compared with the case of the second embodiment, and accordingly any hindrance to the visibility is further eliminated due to the fact that these prisms are observed as transparent.

Although the prism 12 used in the second embodiment and the third embodiment are firmly encased in the case 13 respectively, since the prism 12 is fixed in such a manner that the crest portion P thereof is directed upwards and the third face 12C thereof is facing the case 13 side, the rear end portion of the case 13 and the operating point abutted to the cam 16 at the forward portion of the surface of the case 13 can be disposed with a certain distance therebetween, whereby even when it is rotated by the cam 16, the rotated position can be precisely maintained, and, accordingly, the prism 12 is maintained in a stable state with respect to the dashboard 14. In addition, as shown in each of the embodiments, since the indicated image observed at the driver's seat is the image reflected only once on the inner surface of the second face, no double image can be produced thereby.

Figure 7:
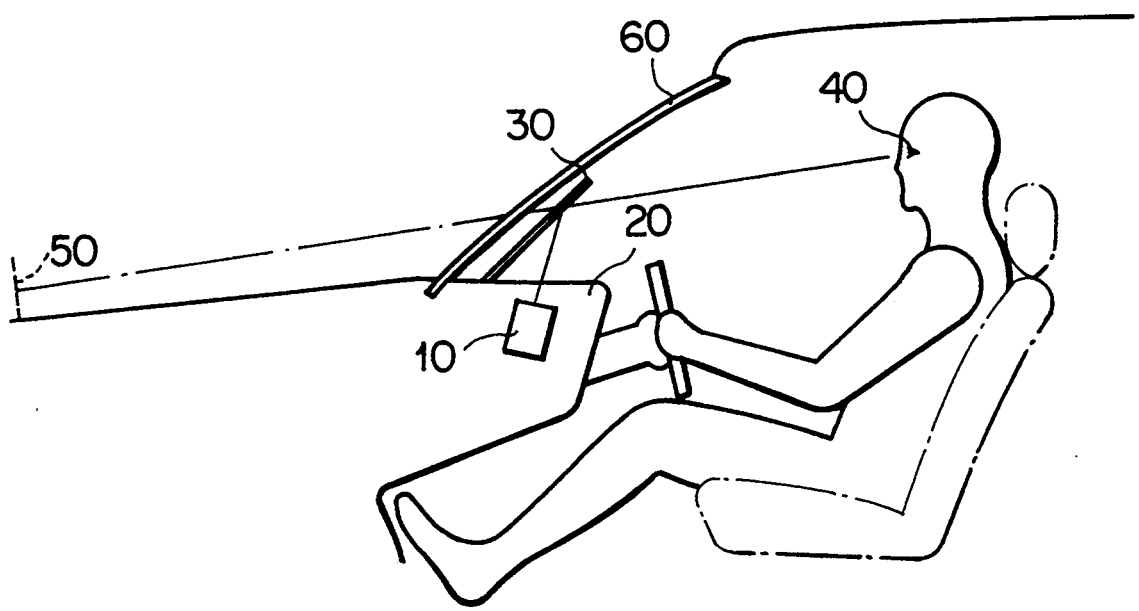
FIG. 7 is an illustration showing an example of a conventionally used head-up displaying device.

In a conventional device, as explained in Fig. 7, although an optical system such as a lens and so on is encased in the projector 10, and a virtual image 50 is thereby magnified at a long distance, the indicated image in the respective embodiments according to the present invention can be magnified and positioned in the long distance by making the first and second faces of the prism in a convex shape, whereby the optical system and the reflecting surface are integrally formed and, therefore, the number of required parts is reduced as well. In this occasion, even if only one of these first and second faces is formed in a convex shape, the indicated image can still be magnified and positioned at a long distance.

As explained heretofore, since the indication display unit for vehicles according to the present invention comprises a prism as a reflecting surface for reflecting the indication light from the indicating member, and the prism is disposed on the dashboard in such a manner that a crest portion of the prism is directed upwards at which a first and a second faces thereof abutting to each other, the two abutting faces being directed, respectively, to the driver's seat and to the windshield, wherein an indication light from the indicating member enters the prism by way of a third face of the prism which is facing the dashboard, and the entered indication light is then reflected on the inner surface of the second face directed to the windshield so as to allow operational information to be visibly observed through the first face, the indicated image can be observed around the visual field of the windshield, and yet no double image is caused due to the fact that the indicated image is reflected only once on the inner surface of the second face of the prism, and further, the reflecting surface is stably disposed on the dashboard due to the width of the third face thereof facing to the dashboard. By all these factors, an indication display unit for vehicles which provides a stably mounted reflecting surface, improved observability and improved quality of the indicated image can be obtained.

In addition, according to each of the above embodiments, since an optical system and a prism is integrally formed by making the prism comprising convex surfaces, number of required parts is reduced, and yet magnified indicated image can be thereby observed at a long distance.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed:

1. An indication display unit for vehicles comprising:
   an indicating means for displaying vehicle operational information encased in a case located within the dashboard, said case being abutted to a cam disposed thereunder,
   a prism having at least three faces and mounted on the dashboard in such a manner that a crest portion thereof is directed upwards at which a first and a second face thereof abut each other, said first face and second face being directed, respectively, toward the driver's seat and to the windshield, and said third face firmly attached to said case such that the indication surface of said indicating means is directed upward, wherein an indicated image projected from said indicating means entering said prism by way of said third face thereof, said indicated image entered said prism being reflected on the inner surface of said second face so as finally to be visibly observed through said first face,
   wherein the rearward portion of said case is axially supported and the forward portion thereof is downwardly biased, whereby said prism is rotated by way of the movement of said case which is activated by the rotating movement of said cam, and in that at least one of said first and second faces is formed in a convex shape, wherein in the case that said second face is formed in a convex shape, the indicating surface of said indicating means is located within the focal point of said second face of said prism, and in the case that said first face is formed in a convex shape, an indicated image reflected on the inner surface of said second face is located within the focal point of said first face of said prism.

2. An indication display unit for vehicles as claimed in claim 1, wherein said indication display unit further comprises a corrective prism which contains a concave surface adjusted with said second face and a concave surface which has substantially the same surface shape as said first face.

* * * * *